(12) United States Patent
Doan

(10) Patent No.: US 7,628,377 B2
(45) Date of Patent: Dec. 8, 2009

(54) OPERATOR ASSIST DEVICE FOR VEHICULAR AIR BRAKE ACTUATION

(76) Inventor: Curtis Michael Doan, 1928 Heather Ct., Indianapolis, IN (US) 46229

( * ) Notice: Subject to any disclaimer, the term of this patent is extended or adjusted under 35 U.S.C. 154(b) by 423 days.

(21) Appl. No.: 11/306,019

(22) Filed: Dec. 14, 2005

(65) Prior Publication Data

US 2007/0131886 A1 Jun. 14, 2007

(51) Int. Cl.
F16K 35/00 (2006.01)
(52) U.S. Cl. .............. 251/90; 251/96; 251/291; 251/337
(58) Field of Classification Search .............. 251/96, 251/95, 90, 100, 291, 293, 337
See application file for complete search history.

(56) References Cited

U.S. PATENT DOCUMENTS

| | | | | |
|---|---|---|---|---|
| 313,249 | A * | 3/1885 | Styne | 251/50 |
| 763,263 | A * | 6/1904 | Cooke | 251/100 |
| 1,049,153 | A * | 12/1912 | Savino | 251/100 |
| 2,536,214 | A * | 1/1951 | Poreber | 239/349 |
| 3,236,974 | A * | 2/1966 | Louden et al. | 337/195 |
| 3,326,375 | A * | 6/1967 | Rosaen | 210/90 |
| 3,460,572 | A | 8/1969 | Hartman | |
| 3,602,245 | A | 8/1971 | Meisel | |
| 3,961,876 | A | 6/1976 | Chernock | |
| 4,019,584 | A | 4/1977 | Allmendinger | |
| 4,024,884 | A | 5/1977 | Prescott et al. | |
| 4,088,374 | A | 5/1978 | Gute | |
| 4,174,055 | A | 11/1979 | Capra et al. | |
| 4,193,641 | A | 3/1980 | Reinecke | |
| 4,437,196 | A | 3/1984 | Louis | |
| 4,572,335 | A | 2/1986 | Kobelt | |
| 4,605,036 | A | 8/1986 | Smith et al. | |
| 4,881,388 | A * | 11/1989 | Pruim | 70/175 |
| 4,907,842 | A | 3/1990 | Goldfein | |
| 4,989,925 | A | 2/1991 | Kohno | |
| 5,046,786 | A | 9/1991 | Johnston et al. | |
| 5,117,872 | A | 6/1992 | Yie | |
| 5,433,410 | A * | 7/1995 | Foltz | 251/100 |
| 5,560,233 | A * | 10/1996 | Watkins | 70/177 |
| 5,671,904 | A * | 9/1997 | Minutillo | 251/96 |
| 5,688,027 | A * | 11/1997 | Johnson | 303/89 |
| 5,813,256 | A * | 9/1998 | von Hagen | 70/177 |
| 5,839,304 | A * | 11/1998 | Wills | 70/175 |
| 2008/0054000 | A1* | 3/2008 | Goldman | 220/360 |

* cited by examiner

Primary Examiner—John K Fristoe, Jr.
Assistant Examiner—Marina Tietjen
(74) Attorney, Agent, or Firm—C. John Brannon; Brannon & Associates PC

(57) ABSTRACT

A mechanical assist assembly for translating a pushing motion from a vehicle operator into an oppositely directed valve deactuation force including a spring cap having a generally round cap portion, a locking recess formed in the cap portion, a helical compression spring operationally connected and extending from the cap portion and a locking bolt extending from a vehicle dash plate. The cap portion may be depressed to actuate the valve actuator, thereby increasing the potential energy of the compression spring. The cap may be rotated a first direction to engage the locking bolt and, once engaged, may be rotated a second direction to disengage the locking bolt. Disengaging the cap portion from the locking bolt enables the helical compression spring to release its stored potential energy and urge the valve actuator into its disengaged position.

3 Claims, 7 Drawing Sheets

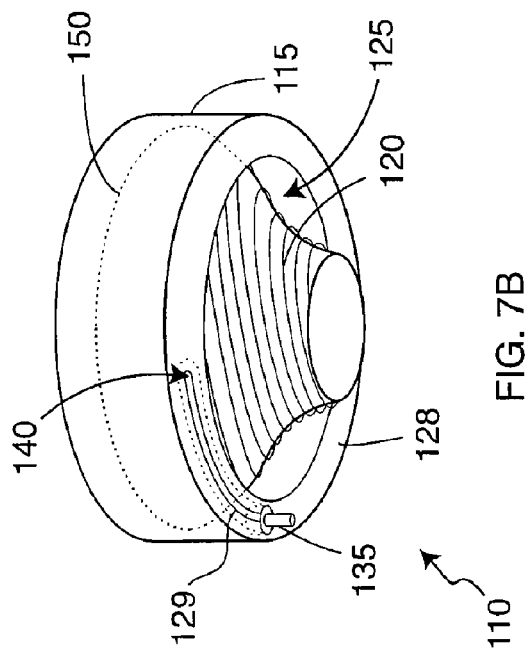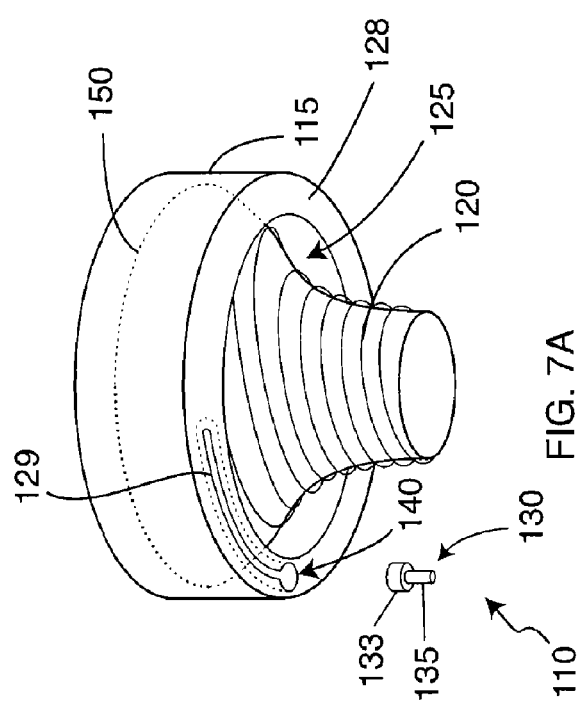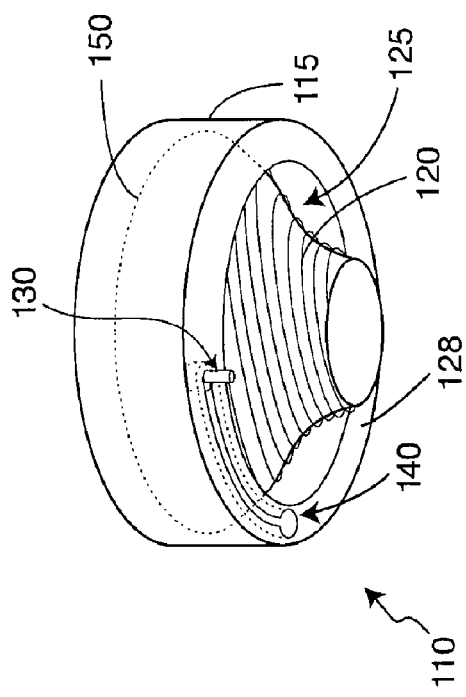

OPERATOR ASSIST DEVICE FOR VEHICULAR AIR BRAKE ACTUATION

TECHNICAL FIELD OF THE INVENTION

This invention relates to an operator assist device for vehicular air brake actuation and, more particularly, to a mechanical assist device for aiding a driver or vehicle operator in repeatedly actuating pneumatic control valves.

BACKGROUND OF THE INVENTION

Service vehicles, such as large trucks and semi-tractors trailers are typically quite massive, especially when laden, and thus are typically equipped with pneumatic brake systems. These brake systems typically have one or more brake valves located in the cab, which the driver may actuate and deactuate to control the brake system. The control valves are typically actuated by pulling a grippable portion of the valve head them towards the operator and are likewise deactuated by pushing the grippable portion in a reverse direction away from the operator. As significant, non-trivial amounts of force are required to actuate the valves and the valves must be frequently actuated and deactuated during the course of operation of the vehicle, routine operation of the vehicle can cause repetitive stress injuries to the operators' hands and wrists. This is especially true for vehicle operators engaged in loading operations and whose job it is to route numerous vehicles to and from a loading dock during the course of their shift.

There is thus a need for a mechanical assist device that aids a vehicle operator in repeatedly actuating pneumatic control valves to thus reduce repetitive stress injuries. The present invention addresses this need.

SUMMARY OF THE INVENTION

The present invention relates to a mechanical assist device for aiding a driver or vehicle operator in repeatedly actuating pneumatic control valves. One object of the present invention is to provide an assembly for repeatedly actuating pneumatic control valves that reduces repetitive stress injuries to the operators' hands and wrists. Related objects and advantages of the present invention will be apparent from the following description.

BRIEF DESCRIPTION OF THE DRAWINGS

FIG. 7A is a first perspective schematic view of the device of FIG. 4 as disengaged from a locking bolt.

FIG. 7B is a second perspective schematic view of the device of FIG. 4 as partially engaged to a locking bolt.

FIG. 7C is a second perspective schematic view of the device of FIG. 4 as engaged to a locking bolt.

DESCRIPTION OF THE PREFERRED EMBODIMENTS

Figure 1:
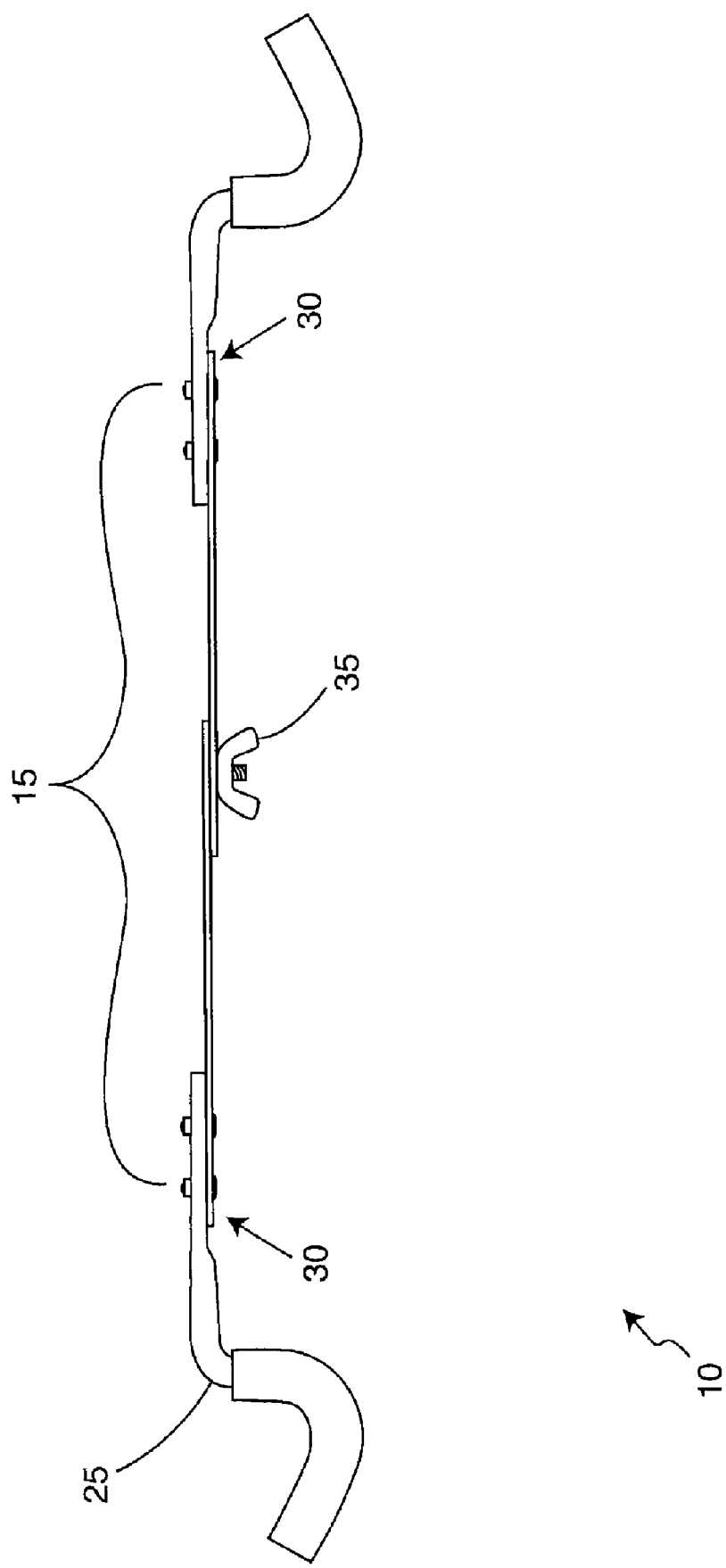
FIG. 1 is a first side elevation view of a first embodiment valve actuation assist device of the present invention.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Figure 2:
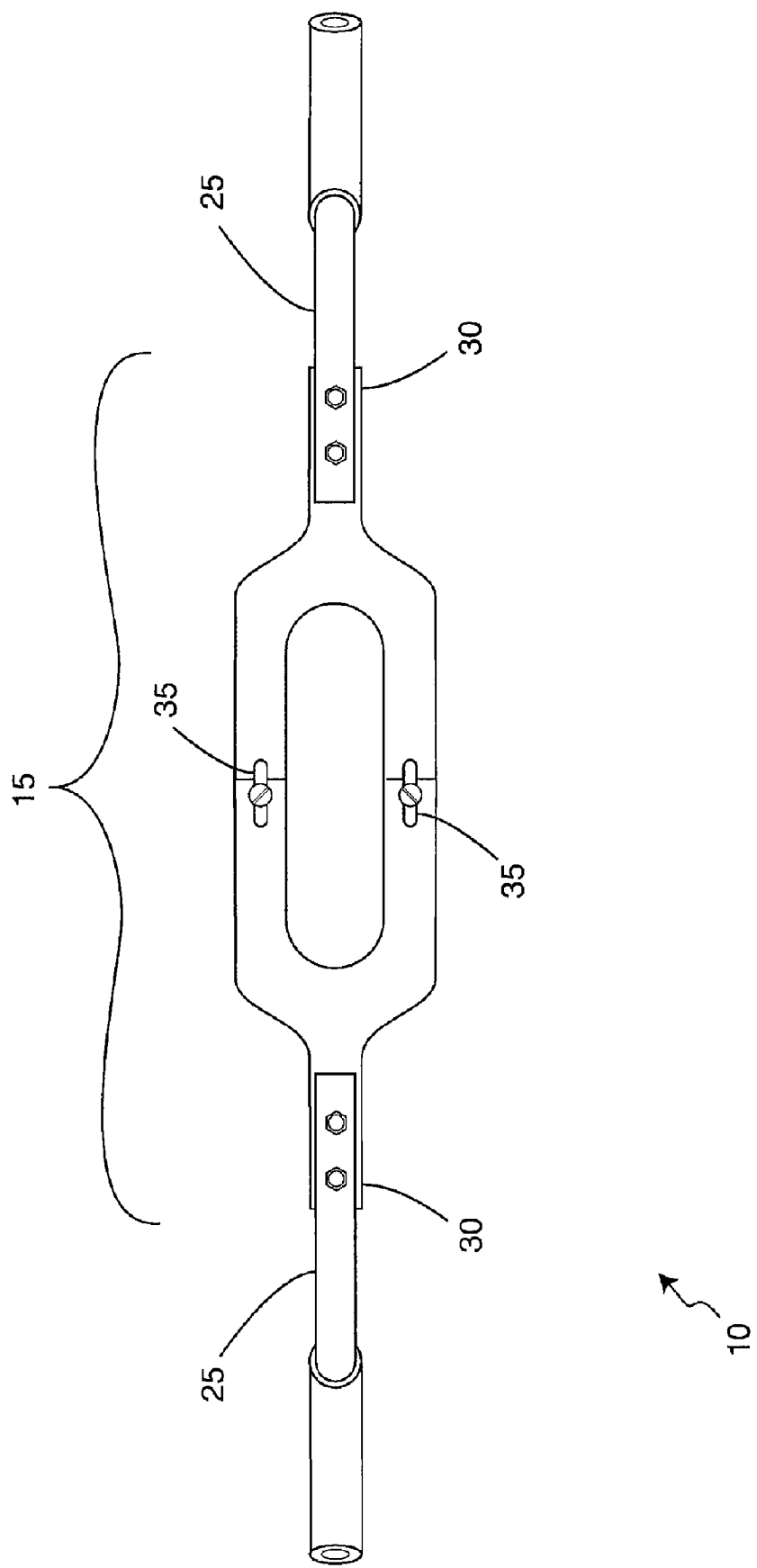
FIG. 2 is a top plan view of the embodiment of FIG. 1.
Figure 3:
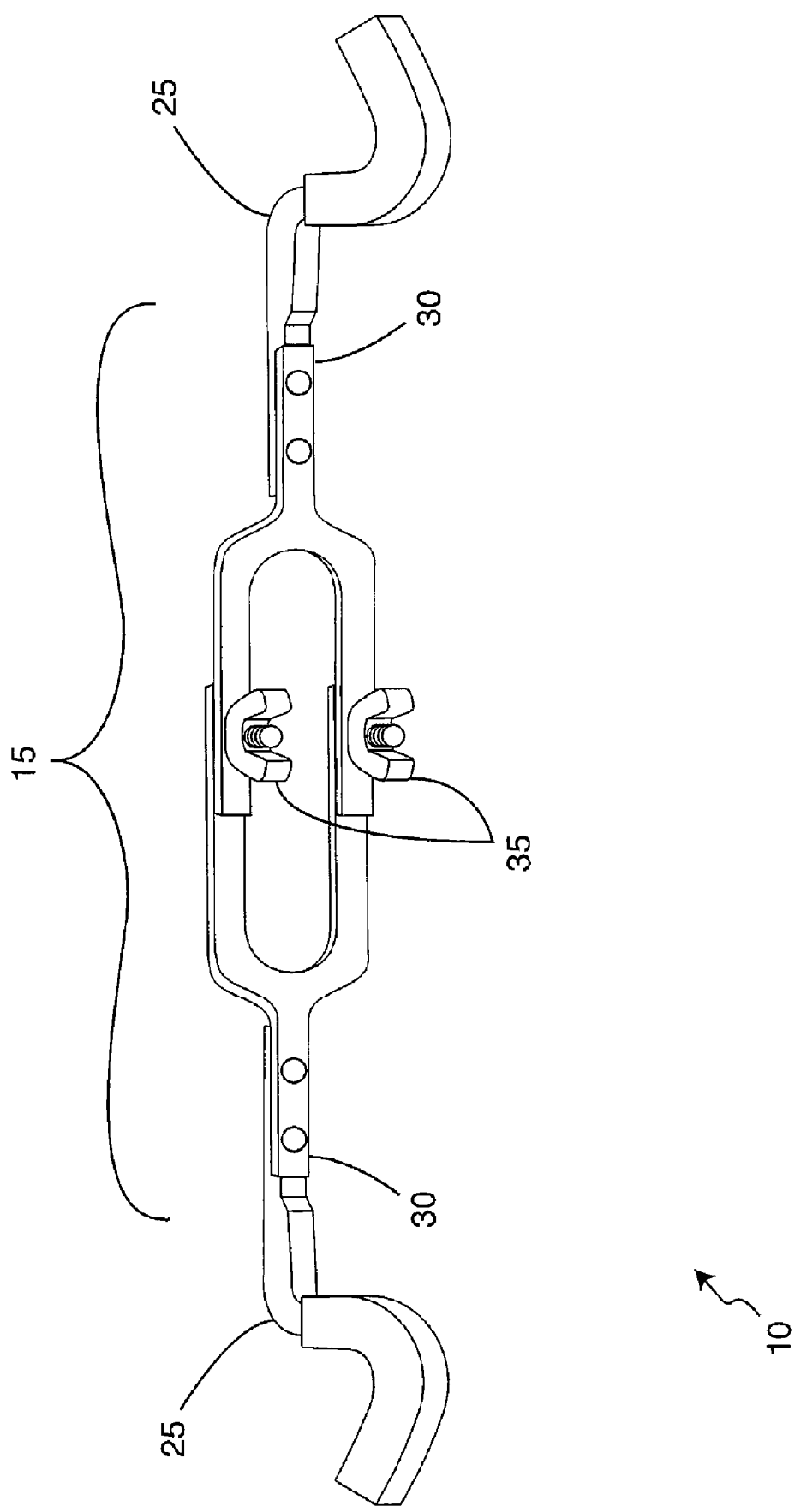
FIG. 3 is a perspective view of the device of FIG. 1.
Figure 4:
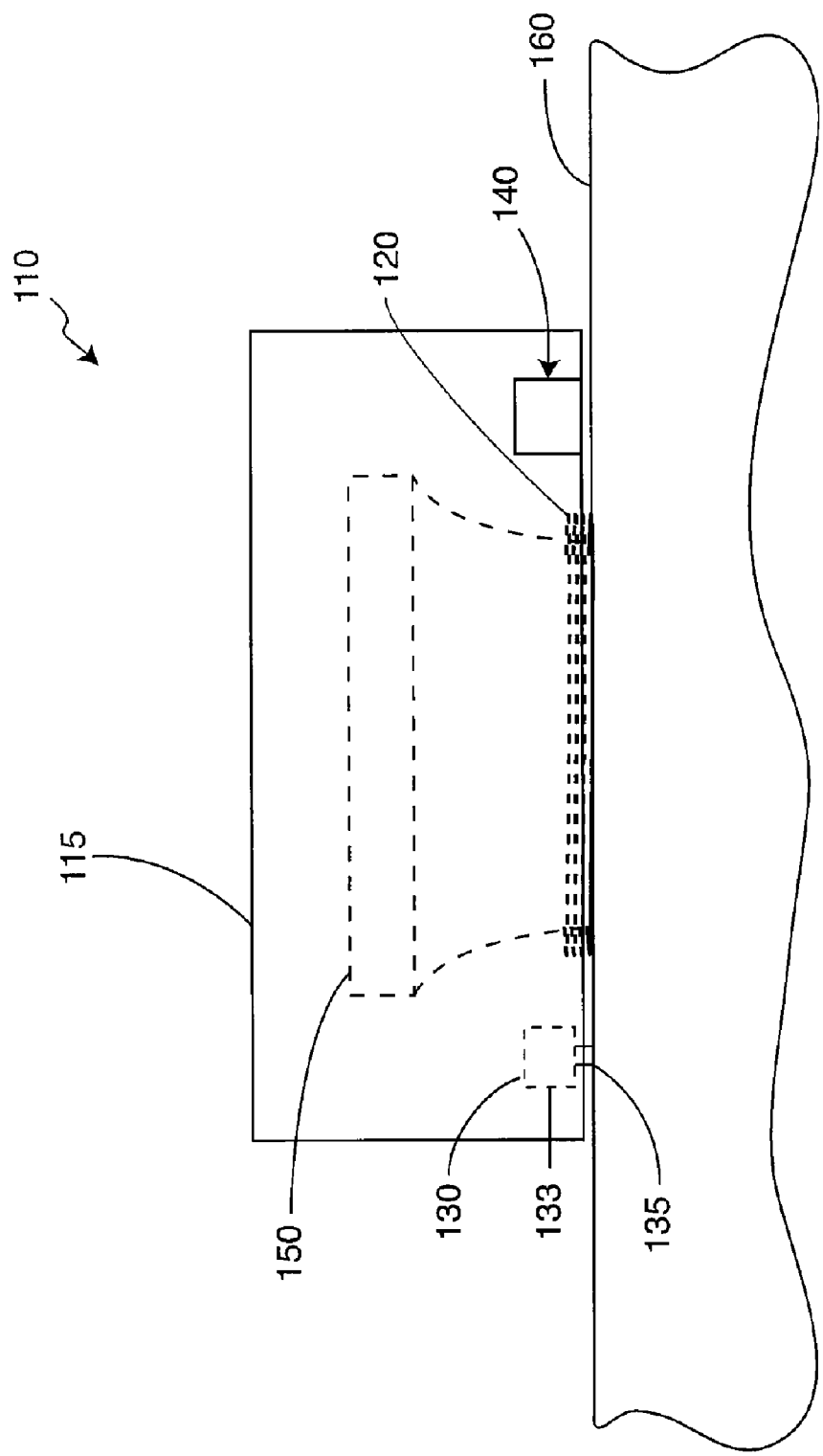
FIG. 4 is a first side elevation view of a second embodiment valve actuation assist device of the present invention.
Figure 5:
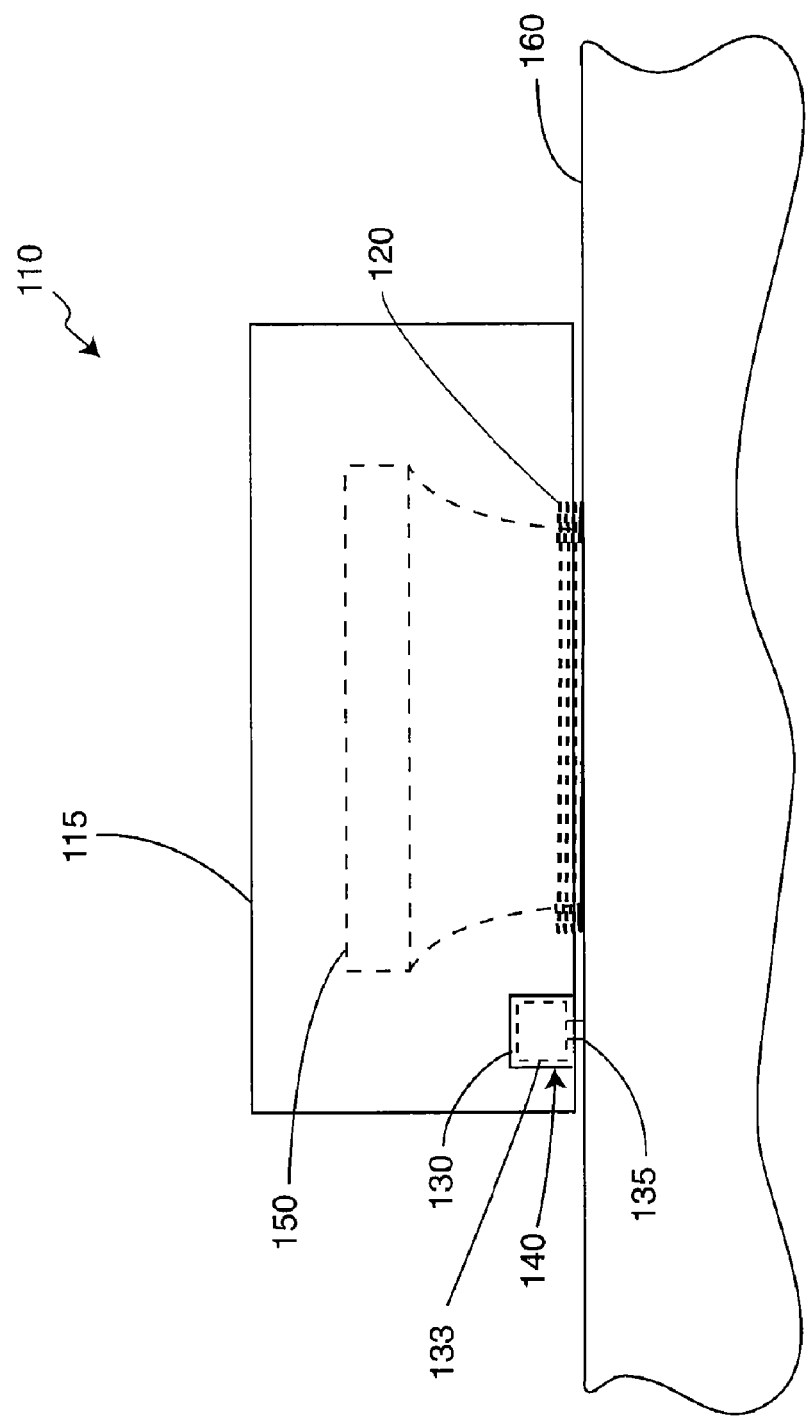
FIG. 5 is a second side elevation view of the device of FIG. 4.
Figure 6:
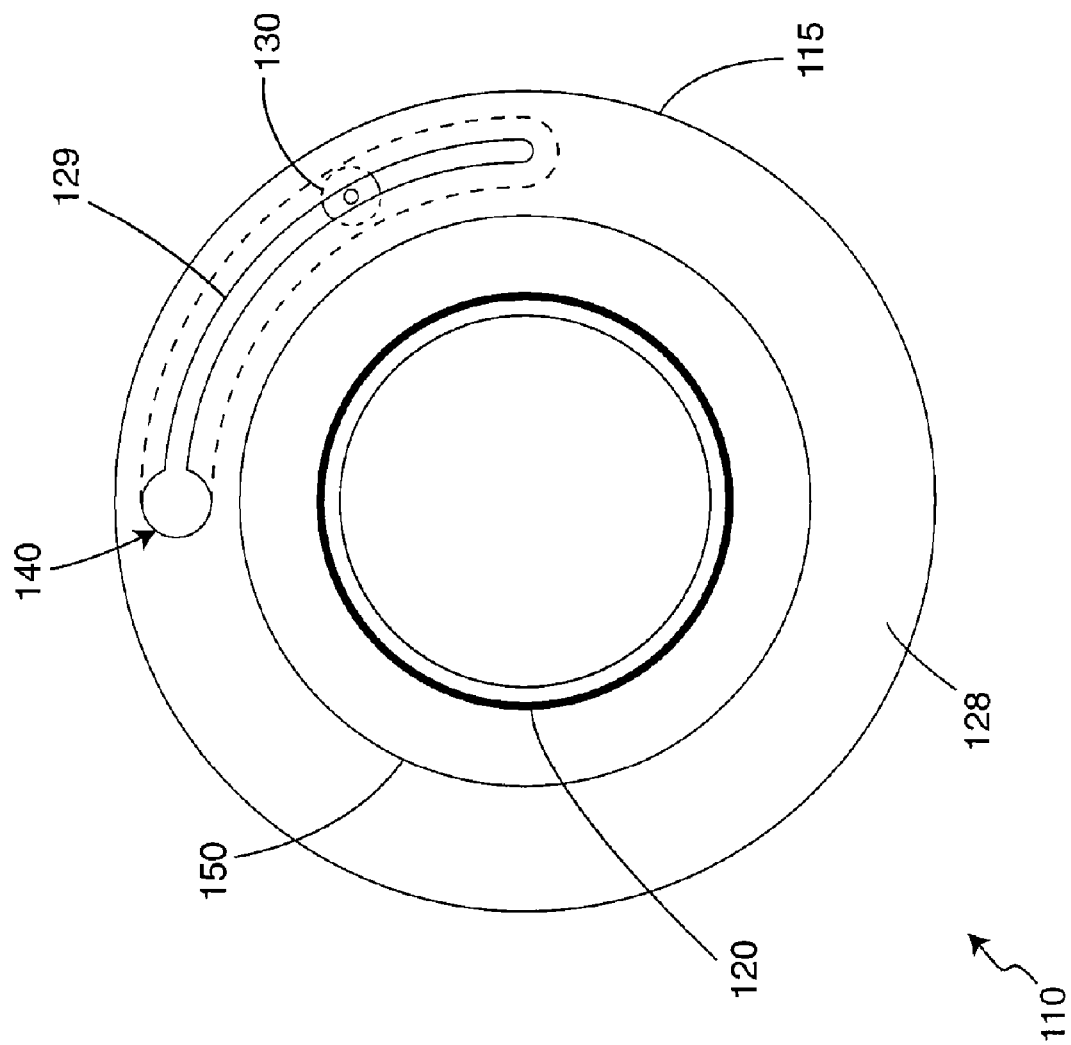
FIG. 6 is a bottom plan view of the device of FIG. 4.

FIGS. 1-3 illustrate a first embodiment of the present invention, a valve actuation assist or spring harness device 10 including a generally flat elongated oval portion 15 adapted to extend around one or more (typically two) push-pull type valve actuators 20 and angled lever-arm portions 25 extending from either end 30 of the elongated oval portion 15. The elongated oval portion 15 is typically of variable size to allow for engagement with valve actuators 20 positioned different distances apart. In one embodiment, the device 10 is constructed from two substantially identical halves fastened together by a pair of tightenable fastener members 35 (such as wingnut/bolt pairs) engaged through apertures 45 formed through the oval portion 15. In this embodiment, the aperture 45 through one half portion 40 is slotted to allow the size of the oval portion 15 to vary.

When the device 10 is operationally deployed around the one or more valve actuators 20, an operator may push down on one or both lever arm portions 25 to flex the spring harness device 10 sufficiently such that a biasing force is applied to the valve actuators 20 to push them toward the operator into their actuated positions. Accordingly, the valves may be both opened and closed via a pushing motion from the operator, thus avoiding repetitive pulling motions associated with stress injuries.

The spring harness 10 is preferably made of a sufficiently flexible material having a large spring constant, such as steel or aluminum, although other like materials may be selected.

In operation, one or more valve actuators 20 are grippingly engaged by the spring harness 10 by positioning the elongated oval portion 15 around the stem portions of the valve actuators 20. When the valve actuators 20 are in the pushed-in, engaged position, application of a pushing force to the ends of the lever arm portions 25 (i.e., a force directed towards the dash) causes the elongated oval portion 15 of the device 10 to bow slightly and flex in the opposite direction of that of the applied force, i.e., away from the dash. The device 10 is grippingly engaged to the valve actuators 20, and thus transmits a force thereto urging the valve actuators 20 away from the dash and into their disengaged positions.

FIGS. 4-7C illustrate a second embodiment of the present invention, valve actuation assist device 110 having a valve actuator engaging or cap portion 115 and a biasing portion 120 connected thereto and extending therefrom. The cap portion 115 further includes an inner cavity 125 sized to receive a valve actuator 150 and a generally flat bottom lip portion 128 defining the cavity opening. The valve actuator 150 extends form a vehicular dash 160 and is movable between a first, actuated position and a second, deactuated position. In the first, actuated position the valve actuator is pushed in closer to the dash 160 while in the second, deactuated position the valve actuator 150 is positioned relatively remote from the dash 160.

The lip portion 128 includes a slotted aperture 129 formed therethrough. An engagement member 130 is fastened to a vehicle dash 160 adjacent to the valve actuator 150 desired to be engaged by the device 110 and positioned to intersect the slotted aperture 129. The slotted aperture has a widened opening 140 formed at one end and sized to receive the engagement member. The engagement member has a relatively wide head portion 133 and a relatively narrow neck or stem portion 135, such that once engaged into the widened aperture 140, the device may be rotated such that the slotted aperture 129 rotates with the stem portion 135 extending therethrough and the head portion 133 lockingly engaged within the cap portion 115.

The cap portion 115 may be made of any structural material, such as steel, aluminum, plastic, or the like. The biasing portion 120 is typically a helical or coil spring, but may alternately be any type of spring or biasing device, such as a compressible rubber or plastic, a leaf spring, or the like.

In operation, the device 110 is positioned over and around a valve actuator 150 such that the cap portion 115 grippingly engages the valve actuator 150 and the biasing portion 120 engagingly extends between the device 110 and the dash 160. Typically, the biasing portion is a coil spring and envelopingly extends around the valve actuator 150. The valve is actuated by applying a depressing force to the cap portion 115. The cap portion 115 is also rotated sufficiently to position the widened opening 140 into alignment with the engaging member 130. The depressing force operates to compress the biasing portion 120, urge the engagement member through the widened opening 140, and engage the valve actuator 150. Compression of the valve actuator 150 acts to increase its potential energy. Once the valve actuator 120 is engaged and the biasing portion 150 is compressed, the cap portion 115 is further rotated to lockingly engage the head portion 133 of the engagement member 130 in the cap portion 115 while the stem portion 135 extends through the aperture 129 to the dash 160.

The valve actuator 150 is disengaged by again applying a depressing force to the cap portion 115 and rotating the cap portion 115 in an opposite direction (i.e., counter-rotating the cap portion 115) until the head portion 133 is aligned with the widened aperture 140. Sudden release of the depressing force allows the potential energy stored in the biasing portion 120 to convert to kinetic energy, and the biasing portion 120 thus applies an upward force to the cap portion 115 in a direction opposite the depressing force, which is transmitted through the cap portion 115 to the valve actuator 150. Thus, the biasing member 120 urges the valve actuator 150 into its second, deactuated position.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method of actuating a push-pull type valve actuator for energizing a pneumatic braking system in a vehicle, comprising the steps of:
   providing a biasing member comprising a generally round cap portion, a locking recess formed in the cap portion, and a helical compression spring operationally connected to the cap portion;
   operationally engaging the locking recess of the biasing member with the valve actuator of a pneumatic braking system disposed on a dash plate having a locking bolt;
   wherein the depression of the cap portion actuates the valve actuator and increases the potential energy of the biasing member;
   wherein rotating the cap in a first direction engages the locking bolt;
   wherein rotation of the cap in a second, opposite direction disengages the locking bolt; and
   wherein disengaging the cap portion from the locking bolt enables the helical compression spring to release stored potential energy and extend in a direction opposite the pushing force and disengages the biasing member from the valve actuator.

2. A method of deactuating a push-pull type valve actuator for pneumatic brakes in a vehicle, comprising the steps of:
   providing a spring cap assembly comprising a generally round cap defining an inner cavity and a compression spring operationally connected to the cap;
   positioning the spring cap assembly on a dash plate of a vehicle having a locking bolt such that the valve actuator is disposed within the inner cavity of the spring cap assembly;
   depressing the spring cap to actuate the valve actuator;
   rotating the spring cap a first direction to engage the locking bolt extending from a the dash plate;
   rotating the spring cap a second direction to disengage the locking bolt;
   wherein disengaging the spring cap from the locking bolt causes the compression spring to disengage the spring cap assembly from the valve actuator.

3. A method for an operator to deactuate one or more push-pull type valve actuators extending from a dash plate in a vehicle, comprising the steps of:
   providing a spring cap assembly comprising a generally round cap defining an inner cavity, a helical compression spring operationally connected to the cap, and a locking bolt;
   positioning the spring cap assembly on the dash plate of a vehicle such that the spring cap assembly operationally engages the one or more valve actuators;
   depressing the spring cap to actuate the valve actuator and store potential energy in the compression ring;
   turning the spring cap in a first direction to lock the spring cap in an engaged position;
   depressing and turning the spring cap in a second, opposite direction;
   releasing stored potential energy from the compression spring; and
   urging the valve actuator into an unengaged position.

* * * * *